April 9, 1963 — W. E. BUCK — 3,084,883
FILM LOADER FOR ROTATING DRUM CAMERA
Original Filed June 6, 1958 — 4 Sheets-Sheet 1
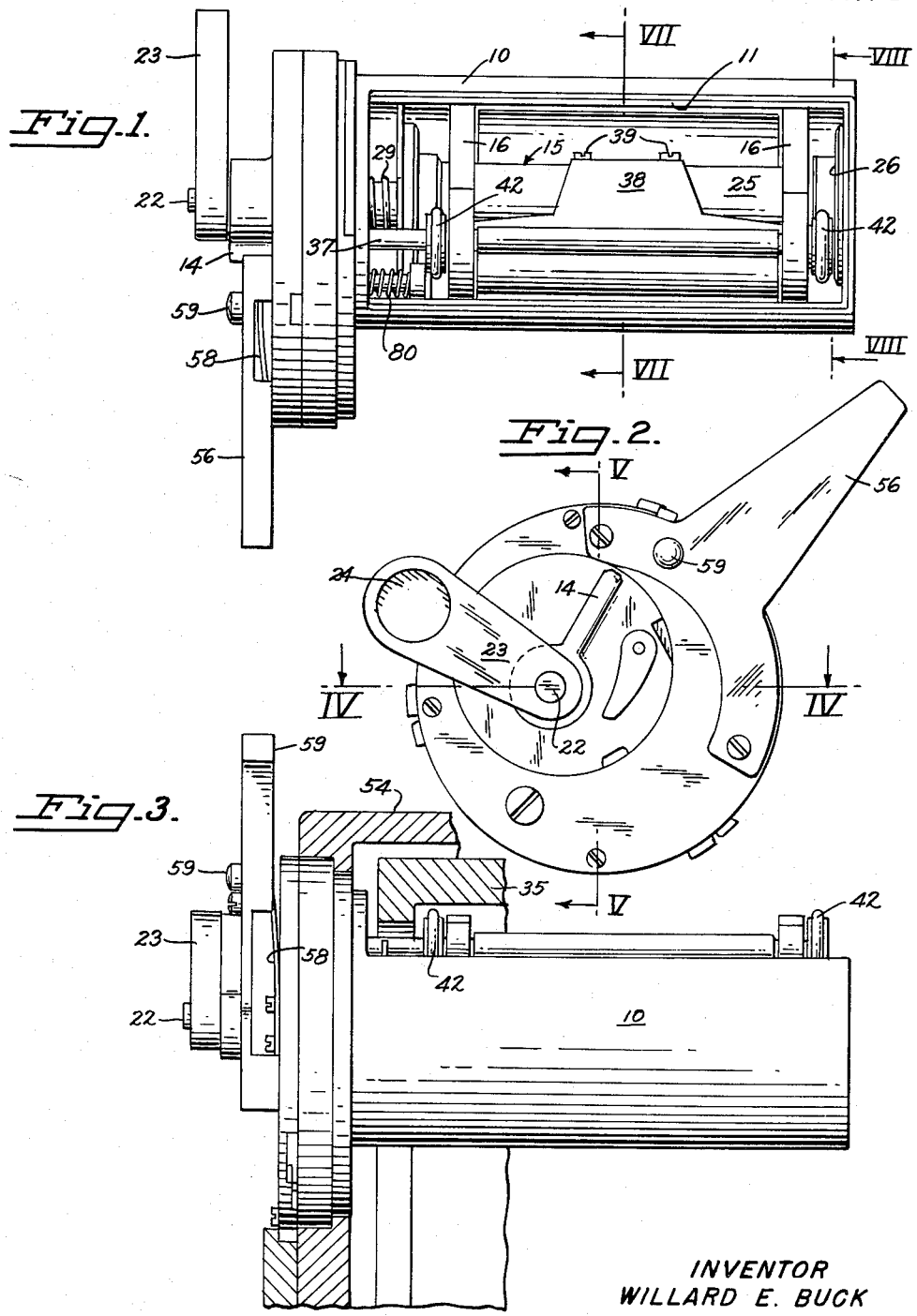
INVENTOR
WILLARD E. BUCK
BY
Fryer & Tjensvold
ATTORNEYS

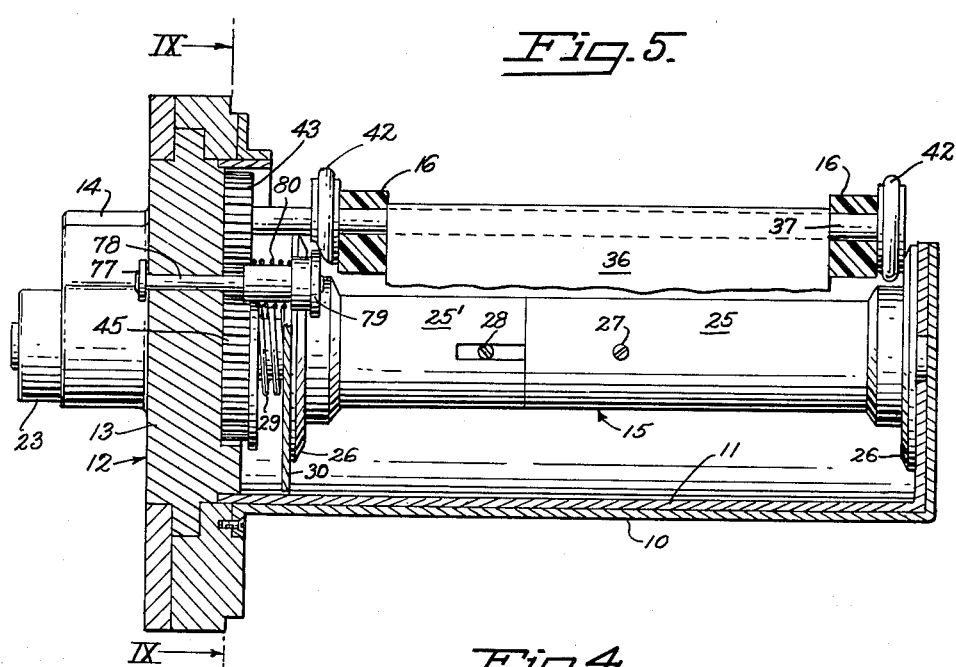
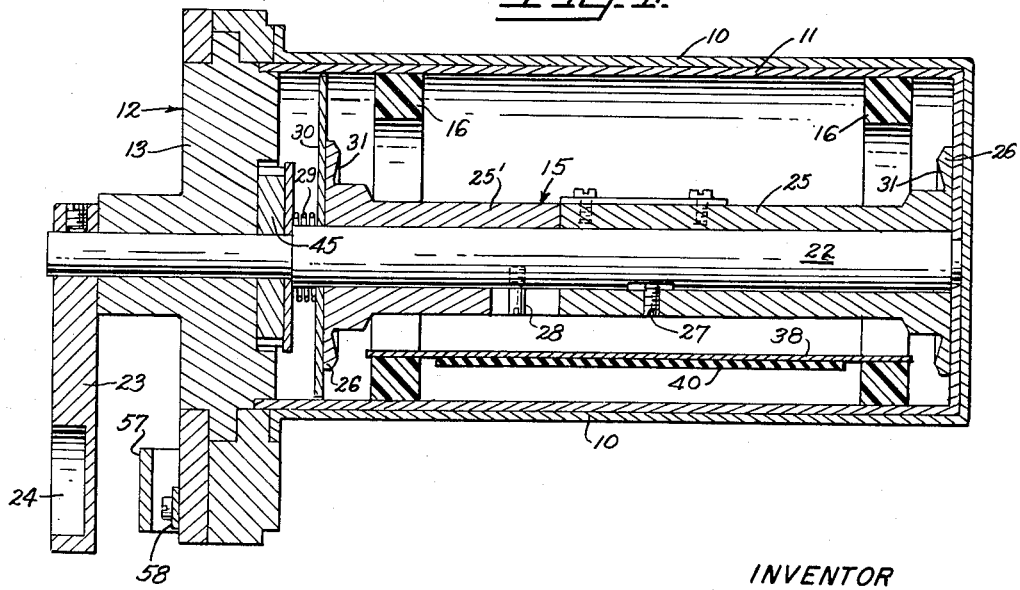

April 9, 1963 W. E. BUCK 3,084,883
FILM LOADER FOR ROTATING DRUM CAMERA
Original Filed June 6, 1958 4 Sheets-Sheet 3

INVENTOR
WILLARD E. BUCK
BY
*Fryer + Tjensvold*
ATTORNEYS

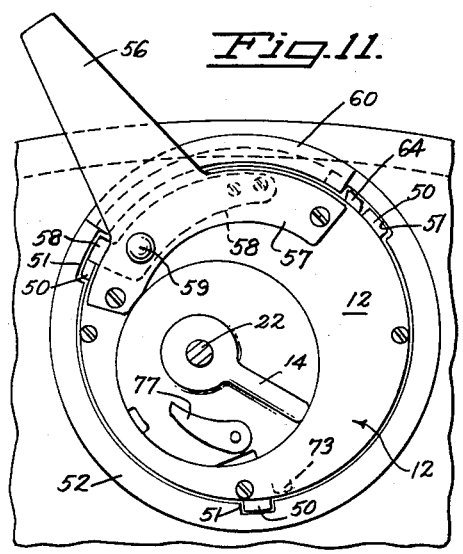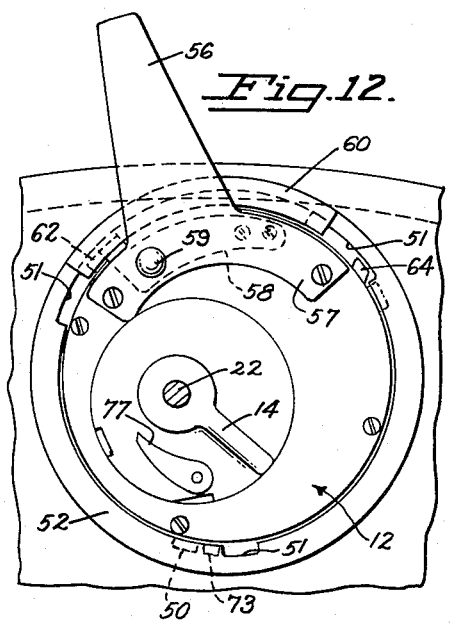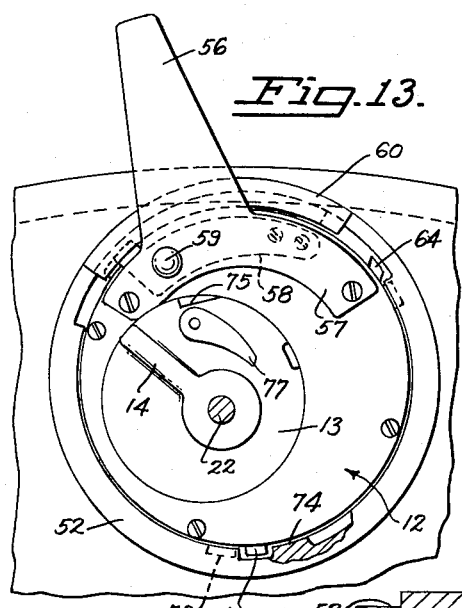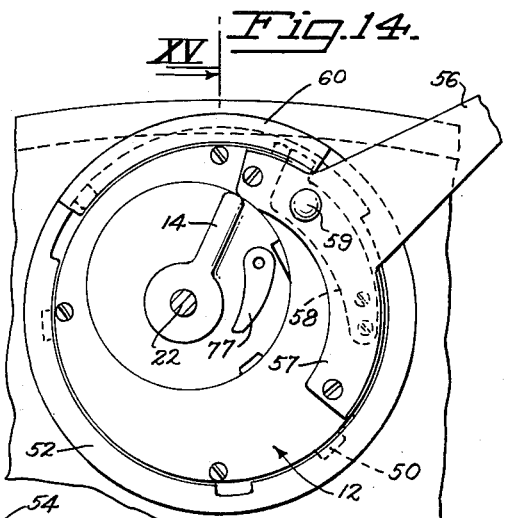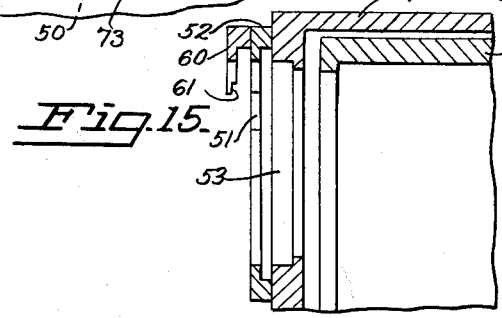

United States Patent Office 3,084,883
Patented Apr. 9, 1963

3,084,883
FILM LOADER FOR ROTATING DRUM CAMERA
Willard E. Buck, Boulder, Colo., assignor, by mesne assignments, to Beckman & Whitley, Inc., San Carlos, Calif., a corporation of Delaware
Original application June 6, 1958, Ser. No. 740,309, now Patent No. 3,007,384, dated Nov. 7, 1961. Divided and this application June 20, 1960, Ser. No. 37,261
6 Claims. (Cl. 242—71.1)

This invention relates to the loading and unloading of film in a camera of the rotating drum type. This application is a division of my co-pending application of the same title Serial No. 740,309, filed June 6, 1958, now Patent No. 3,007,384.

Many high speed cameras and particularly those of the so-called streak type comprise a rotatable drum, the inner cylindrical surface of which supports film upon which an event to be recorded is focused by a lens and mirror system while the drum is rotated. The drum is, of course, encased in a light proof housing and the problem with which the present invention is concerned is the introduction of a strip of unexposed film into the drum and its removal after exposure without exposing it to light so that it may safely be transported to a dark room for developing.

It is an object of the invention, therefore, to provide a film container or cassette of generally cylindrical form with a light proof closure which may be inserted into the camera through a suitable opening in the housing, opened after it is so inserted and actuated from the exterior of the housing to deposit a strip of film on the inner surface of the rotatable drum.

A further object of the invention is to provide such a device with means for recovering the film after it has been exposed in the camera and means to close the cassette prior to its removal from the camera to protect the film until such time as it is developed.

Still another object of the invention is to provide such a device with safety means to prevent its removal from the camera while the cassette is open and means to indicate exteriorly of the camera housing whether or not a strip of film is contained in the cassette.

Further and more specific objects and advantages of the invention are made apparent in the following specification wherein the invention is described in detail by reference to the accompanying drawings.

In the drawings:

FIG. 1 is a plan view of a film loader embodying the present invention showing the loader in its open position;

FIG. 2 is an end elevation of the loader shown in FIG. 1 as viewed from the left side of FIG. 1;

FIG. 3 is a side elevation of the loader shown in FIGS. 1 and 2 illustrating a portion of a camera in which the loader is mounted;

FIG. 4 is a central sectional view taken on the line IV—IV of FIG. 2;

FIG. 5 is a central sectional view taken on the line V—V of FIG. 2;

FIGS. 11, 12, 13 and 14 are end elevations taken from the same direction as FIG. 10 illustrating the loader in different positions after it has been inserted into a camera housing, a crank member being omitted for clarity, and FIG. 15 is a fragmentary section of the camera taken on the line XV—XV of FIG. 14 with the loader removed.

Figure 6:
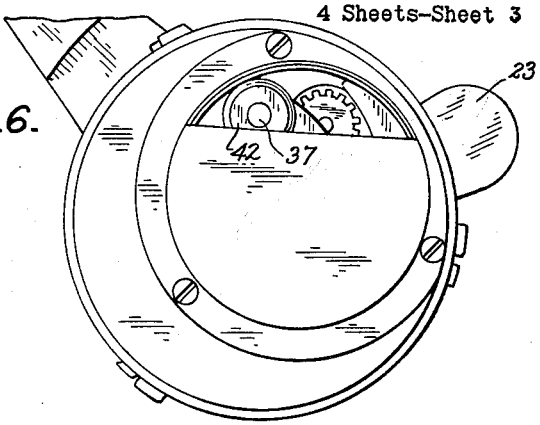
FIG. 6 is an end elevation as viewed from the right side of FIG. 1.

Referring to the drawings in detail and first to FIGS. 1 to 5, inclusive, the film loader of the present invention is shown as comprising a cassette 10 of generally cylindrical form with one side cut away and a closure for the cut away side in the form of a second similarly cut away cylinder 11 encased within the cassette (see FIG. 7) and rotatable therein to provide a light proof closure for the opening thereof. The cassette 10 is mounted on a head or supporting member generally indicated at 12 which is adapted to fit within a suitable opening in a camera housing, as will later be described in detail, in such a position that the cassette is disposed in close proximity to the inner surface of the rotatable drum of the camera. When the cassette is so disposed, the closure thereof may be opened and film disposed within the cassette may be transferred to the drum where, during the usual operation of the camera, it will be exposed. After exposure, an end of the film which curls away from the drum because of the tension that it receives from being spooled within the cassette may be caused to enter the cassette so that the exposed film may again be coiled or spooled within the cassette whereupon the closure is actuated to its closed or light proof position enabling the entire loader to be removed from the camera and transported to a dark room for development of the film and reloading. To enable the opening and closing of the cassette in the manner described, the closure member 11 is supported as best shown in FIGS. 4 and 5 on an end member 13 which is rotatably contained in the head 12 and is formed with an external radially extending lug 14 to enable it to be rotated. The spooling mechanism is contained within and carried by the closure 11 of the cassette and comprises a spool generally indicated at 15 and a pair of guide members 16 preferably formed of a non-metallic material such as nylon or the like. The shape of these guide members is best illustrated in FIG. 8 and is circular to fit closely within the closure member 11. Each member 16 has a circular film receiving opening 18 concentric with the spool 15 and connected by an entry slot 19 with its outer periphery to admit film, a strip of which is illustrated at 20 in FIG. 8. Consequently the film which surrounds the spool does not come in contact with the central or spindle portion of the spool but is laid against the interior of the circular openings 18 in the receiving members 16.

The construction of the spool 15 is best shown in FIGS. 4 and 5 wherein a main shaft 22 thereof is shown as journalled for rotation at one end in the end of the closure member 11 and as having its opposite end extending through the member 13 and having secured thereto a crank 23. This crank is provided with a depression 24 which permits the crank 23 to be rotated by an operator's finger.

On the shaft 22 are two spool parts each having spindle portions 25 and 25' and flange portions 26. The right hand portion 25 as viewed in FIG. 4 is secured to the shaft 22 as by a set screw 27 and the left hand portion 25' is secured as by a pin and slot connection 28 enabling it to slide longitudinally of the shaft. The latter section is urged inwardly into abutment with the right hand section by a spring 29 encircling the shaft and engaging a friction plate 30 which in turn engages the end of the spool. The flanges 26 of the spool are undercut at an angle as illustrated at 31 so that as the film is wound into the opening 18 of the member 16, only the outer layer of the wound film is actually contacted by the flanges of the spool. Since the film is slightly wider than the distance between the flanges at their undercut portions 31, reception of the film on the spool will cause slight spreading of the flanges against the tension of the spring 29 and the outer layer only of the film will be so gripped edgewise that during discharge of the film, the outer layer being discharged first, the feed rate will remain constant and in proper ratio to the speed of the drum surface upon which the film is being deposited as will later more clearly appear.

In operation, the drum of the camera partially illustrated at 35 in FIGS. 3 and 8 is rotated upon actuation of the hand crank 23, by means later to be described, and depending upon the direction of rotation the film is unwound from the spool 15 and laid against the inner surface of the drum or picked up from the drum and wound about the spool. While the camera is in operation the high speed of the drum compels the film to adhere closely to its inner surface but after exposure of the film, when the drum 35 comes to rest, one end of the film curls inwardly slightly, and will be received readily by the entering slot 19 of the film carrying members 16.

Figure 7:
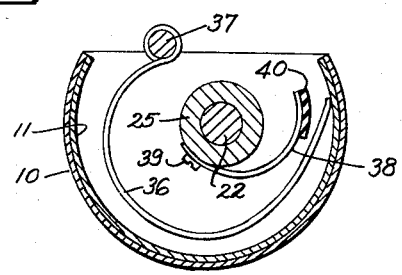
FIG. 7 is a transverse sectional view taken on the line VII—VII of FIG. 1.
Figure 8:
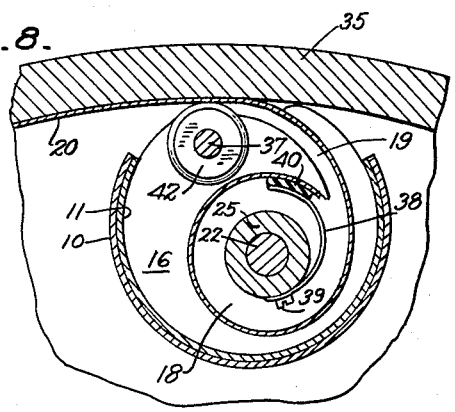
FIG. 8 is a sectional view taken on the line VIII—VIII of FIG. 1 and illustrating a portion of the drum of the camera with film in position as it is being loaded or unloaded from the camera.
Figure 9:
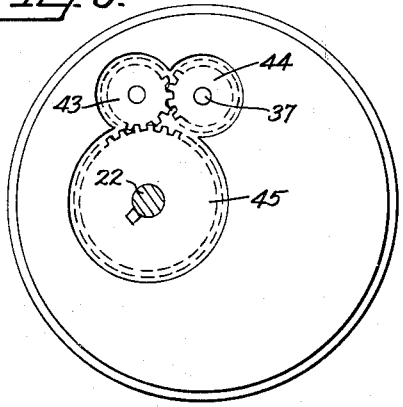
FIG. 9 is a section taken on the line IX—IX of FIG. 5.

To insure the film being directed into the circular openings 18 of the carrying members 16, a curved ramp shown at 36 in FIG. 7 (see also FIG. 5) is supported on a shaft 37 which extends throughout the entire length of the closure member 11 and is carried in the members 16 through which it passes. The entering end of the film engages this ramp which guides it into the entry slots 19 and a resilient drag 38 secured to the spool 15 as by screws 39 carries a resilient pad 40 which engages the film causing it to slide along the ramp 36 into the openings 18. A pair of rollers with resilient tires shown at 42 are fixed to the shaft 37 and the shaft is connected for rotation by a gear train including the gears 43, 44 and 45 (see FIG. 9 and FIG. 4) so that the rollers are driven upon rotation of the spool shaft 22 to which the gear 45 is keyed.

In the loading and unloading position which is that shown in FIG. 8, the rollers 42 are spaced to engage and press the film 20 into firm contact with the inside of the drum 35 with the result that the rollers in effect drive the film and the drum at the proper speed. This is essential to insure that the film is placed or removed from the inner surface of the drum at the proper speed to prevent buckling or stretching and at this point it can be understood that the reason for holding the film in the circular spaces 18 and loading and unloading from the outside of a roll of film so confined, is to insure feeding of the film at a constant speed rather than at a variable speed which occurs when a web is uncoiled from a spool upon which it is directly wound. It is important also that the driving ratio of the gear train 43, 44, 45 be the same as the ratio of the size of the circular spaces 18 and the feed rollers 42 to insure feeding of the film onto the drum at the proper rate.

FIGS. 11 to 15 illustrate the manner in which the loader is first inserted into an opening in a camera housing and the cassette thereafter opened and brought into the position shown in FIG. 8 where it is in readiness to deposit the film in the camera drum.

Referring first to FIG. 11, the head 12 of the loader is shown as having three radially projecting lugs 50 which enter notches 51 in the inner periphery of a flanged retaining ring 52 suitably secured to the camera housing in registry with an opening 53 therein as shown in FIG. 15 wherein the housing is designated by the reference character 54. When the loader is inserted in this manner, it is rotated a few degrees clockwise to the position illustrated in FIG. 12 where the lugs 50 underlie the flange of the retaining ring 52 to prevent removal of the loader. The entire cassette, as is apparent from the drawings, is eccentrically mounted with respect to the head 12 and due to this eccentricity, it clears the drum upon insertion. In order to bring it into the position of FIG. 8, the cassette must first be opened and then the head member 12 rotated in a clockwise direction where it will assume the position illustrated in FIG. 14.

Figure 10:
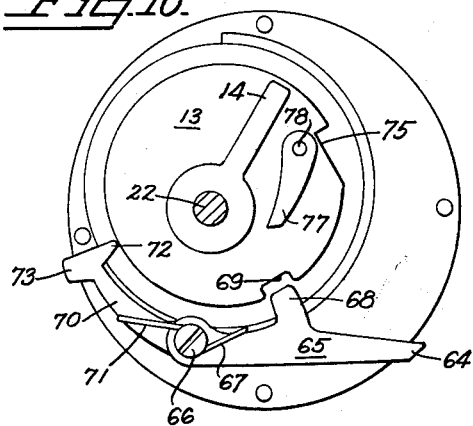
FIG. 10 is an end elevation as viewed from the left of FIG. 5 with a plate removed to expose underlying mechanism.

Interlocks are provided to prevent rotation of the loader in the camera housing before the cassette is opened and to prevent its removal from the housing before the cassette has been closed. The structure of these interlocks is also shown in FIGS. 11 and 12. A lever 56 is carried on a bracket 57 secured to the head 12 but spaced outwardly therefrom to accommodate a spring latch 58 resiliently urged outwardly and carrying a button 59 which projects through a suitable opening in a bracket 57 so that the latch can be depressed. When the loader is first inserted and rotated to the position of FIG. 12 which secures it within the camera housing, the end of the latch 58 comes to rest beneath an arcuate retainer member 60 (see also FIG. 15). This arcuate retainer has notches on its inner surface one of which is illustrated at 61 in FIG. 15 and the other of which is illustrated in dotted lines at 62. The latch 58 in the position of FIG. 12 therefore rests in the notch 62 and prevents further rotation of the loader. Also preventing rotation of the loader until the cassette has been opened is the tail 64 of a lever 65 shown in FIG. 10 pivoted as at 66 and urged outwardly by a spring 67. This lever carries a finger 68 in a position to bear against the outer periphery of the end member 13 of the cassette closure to prevent its inward swinging movement except when the cassette is fully opened and a notch 69 registers with the lever to permit it to swing inwardly. In the position of FIG. 12, therefore, rotation of the head member is prevented by engagement of the tail 64 against the end of one of the notches 51 but when the cassette has been opened by turning of the lug 14 to the position of FIG. 13, the loader can be rotated to bring the cassette into the position of FIG. 8 by simply depressing button 59 to release latch 58. It is in this position that the crank 23 is rotated to effect depositing of the film on the inside of the drum as hereinbefore described.

The lever 65 with its finger 68 projecting into the notch 69 when the cassette is opened also prevents closing of the cassette in its loading position which, as is apparent from FIG. 8, would result in interference between the closure member 11 and the drum.

Upon completion of the film loading operation, the entire loader is returned to the position of FIG. 13 so that the cassette will not be in engagement with the rotating drum. Before returning it to this position, it is again necessary to depress the latch button 59 because of the fact that the latch 58 was lodged in the notch 61 during the loading operation.

To position the cassette for unloading the film which is again the position illustrated in FIG. 8, depression of the button 59 again permits rotation to the FIG. 14 position. When the film has been removed from the drum into the cassette it is then necessary to close the cassette before the loader can be removed from the camera.

The interlocking mechanism which prevents removing the loader from the camera housing while the cassette is open includes a lever 70 (see FIG. 10) also pivoted at 66 and urged inwardly by a spring 71. The lever 70 has a toe 72 and a heel portion 73 clearly shown in FIGS. 11 and 13. When the cassette is opened the toe 72 bears against the periphery of the member 15 projecting the heel 73 outwardly to the position shown in FIG. 13 where it obstructs counter-clockwise rotation of the loader by engagement with a solid portion 74 in the retainer ring 52. When the cassette is closed, the toe 72 of lever 73 enters a notch 75 in the periphery of the member 13 retracting the heel 73 and permitting removal of the loader.

In order that an operator may determine whether the cassette is loaded with film without opening it and endangering the film by exposure to light, an indicating pointer 77 is disposed on the outside of the member 13. This member is carried by a shaft 78 journaled in the member 13 and projecting into the cassette which carries a similarly shaped member 79, the back of which is shown in FIG. 5, and a torsion spring 80 causes this member to bear against the film which surrounds the spool. Consequently the presence of film on the spool is indicated by the position of the pointer 77.

I claim:

1. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the openings in said guide members, said spool having end flanges undercut at an angle, and resilient means urging said flanges toward each other whereby only the outer layer of the coil of film will be engaged between said flanges.

2. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the openings in said guide members, said spool having end flanges undercut at an angle, resilient means urging said flanges toward each other whereby only the outer layer of the coil of film will be engaged between said flanges, and means to rotate the spool to feed said coil out of the cassette.

3. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the openings in said guide members, said spool having end flanges undercut at an angle, resilient means urging said flanges toward each other whereby only the outer layer of the coil of film will be engaged between said flanges, means to rotate the spool to feed said coil out of the cassette, and roller means driven by the spool to engage and press the film into contact with a camera drum surface upon which the film is being placed.

4. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the openings in said guide means, said spool having end flanges undercut at an angle, resilient means urging said flanges toward each other whereby only the outer layer of the coil of film will be engaged between said flanges, means to rotate the spool to feed said coil out of the cassette, and roller means driven by the spool to engage and press the film into contact with a camera drum surface upon which the film is being placed, the ratio of the drive between the spool and rollers being inversely equal to the ratio of size between the outer layer of the coil and the rollers.

5. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the walls of the openings in said guide members, and a drag member carried by the spool and resiliently urged outwardly therefrom to engage an entering end of film and cause it to slide into said openings.

6. In a film loader of the kind described, a generally cylindrical film cassette with a light tight closure, a film spool rotatably supported in the cassette, guide members with circular openings concentric with the spool and with slots communicating between said openings and the exterior of the cassette when the closure is open whereby a coil of film in the cassette will be confined by the walls of the openings in said guide means, and a drag member carried by the spool and resiliently urged outwardly therefrom to engage an entering end of film and cause it to slide into said openings, and ramp means associated with the drag member for guiding the film into said openings.

References Cited in the file of this patent

UNITED STATES PATENTS

| | | |
|---|---|---|
| 1,799,184 | Slocum et al. | Apr. 7, 1931 |
| 1,973,457 | Wittel | Sept. 11, 1934 |
| 2,205,052 | Stein | June 18, 1940 |
| 2,205,376 | Gottesman | June 18, 1940 |
| 2,239,188 | Boes | Apr. 22, 1941 |
| 2,508,095 | Bolsey | May 16, 1950 |
| 2,719,679 | Nerwin et al. | Oct. 4, 1955 |
| 2,734,692 | Robinson | Feb. 14, 1956 |
| 2,983,462 | Berlings | May 9, 1961 |

FOREIGN PATENTS

| | | |
|---|---|---|
| 571,543 | Germany | Mar. 2, 1933 |